UNITED STATES PATENT OFFICE.

FRANK L. BUCHANAN, OF OAKLAND, CALIFORNIA.

COMPOSITION FOR PAINT.

1,381,274.  Specification of Letters Patent.  Patented June 14, 1921.

No Drawing.  Application filed March 20, 1920. Serial No. 367,457.

*To all whom it may concern:*

Be it known that I, FRANK L. BUCHANAN, a citizen of the United States, residing at the city of Oakland, in the county of Alameda and State of California, have invented certain new and useful Improvements in Compositions for Paint, of which the following is a specification.

My invention relates to improvements in preservative coatings and fillers, and the composition with slight variations may be used as a roof paint for preserving new roofs, and for repairing old roofs of metal, shingles or composition. It is useful as a wood paint, filler and preservative, and by the addition of pigments becomes a valuable paint. Furthermore it is adaptable as a metal paint being useful on iron as a rust preventive, and is capable of withstanding the heat and fumes of smokestacks. By slight variations in composition the paint may be used for brick, concrete and stucco work.

With these and other objects in view my invention consists of a mixture of micaceous iron ore, a varnish, an oil, a volatile thinning agent, and where desired a colored pigment.

When my composition is employed for a roof paint or similar purpose, I employ substantially equal parts of varnish, crude petroleum oil, benzin or gasolene or distillate or one of the other lighter hydrocarbon oils and micaceous or specular hematite. The iron ore which I employ in my composition consists of approximately 75% of iron oxid, about 4% each of limestone, granite, silica and iron pyrites, and 9% of talc or soapstone.

When the composition is used as a paint for brick, cement, or wood, I substitute for the oil and thinner above mentioned, boiled linseed oil, and turpentine, and where the paint is used on iron or smokestacks, I use a raw linseed oil, for the oil, benzin and turpentine for the thinner.

Hence the composition for paint consists of substantially equal parts, varnish, boiled linseed oil, Japan drier, turpentine, and micaceous iron ore. The composition for iron or smokestack work comprises substantially equal parts, varnish, raw linseed oil, benzin, turpentine and iron ore of the micaceous or specular hematite varities.

In the roof paint in place of the varnish, I may use gilsonite cut in benzin or similar hydrocarbon oils, and it will be understood that in all these compositions the amount of thinner is dependent on the condition of the other ingredients, and is just sufficient to give the composition the right consistency that it will flow readily from a paint brush.

The iron ore of approximately the composition above described is ground uniformly so that it will pass through a sieve of not less than 180 meshes to the inch.

During this grinding and sifting operation, the various minerals of which the ore is composed, are intimately mixed. This dry powder is then mixed with the varnish, oil, and sufficient thinner to give the proper consistency.

Having thus described my invention I claim:

1. A paint composition comprising the following ingredients: a varnish, an oil, a thinner, specular hematite, limestone, granite, silica, iron pyrites, and talc.

2. A paint composition comprising, varnish 100 pounds, oil 100 pounds, a thinning agent 100 pounds, hematite 75 pounds ground limestone 4 pounds, ground granite 4 pounds, ground silica 4 pounds, ground iron pyrites 4 pounds and powdered talc 9 pounds.

3. A paint composition comprising, varnish 100 pounds, a drying oil 100 pounds, a thinning agent 100 pounds, hematite 75 pounds, ground limestone 4 pounds, ground granite 4 pounds, ground silica 4 pounds, ground iron pyrites 4 pounds, and powdered talc 9 pounds.

In testimony whereof I affix my signature.

FRANK L. BUCHANAN.